(12) United States Patent
Itadani et al.

(10) Patent No.: US 10,495,228 B2
(45) Date of Patent: Dec. 3, 2019

(54) SEALING DEVICE (71) Applicant: EAGLE INDUSTRY CO., LTD., Minato-ku, Tokyo (JP)

(72) Inventors: Masatoshi Itadani, Tokyo (JP); Keiichi Chiba, Tokyo (JP); Hideyuki Inoue, Tokyo (JP); Yuichiro Tokunaga, Tokyo (JP); Kenji Kiryu, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 102 days.

(21) Appl. No.: 15/741,203

(22) PCT Filed: Jun. 28, 2016

(86) PCT No.: PCT/JP2016/069062
§ 371 (c)(1),
(2) Date: Dec. 29, 2017

(87) PCT Pub. No.: WO2017/002774
PCT Pub. Date: Jan. 5, 2017

(65) Prior Publication Data
US 2018/0195618 A1    Jul. 12, 2018

(30) Foreign Application Priority Data
Jun. 30, 2015    (JP) .................... 2015-131451

(51) Int. Cl.
*F16J 15/34*    (2006.01)
(52) U.S. Cl.
CPC ......... *F16J 15/3416* (2013.01); *F16J 15/342* (2013.01); *F16J 15/3412* (2013.01)
(58) Field of Classification Search
CPC ..... F16J 15/3412; F16J 15/3416; F16J 15/342
See application file for complete search history.

(56) References Cited

U.S. PATENT DOCUMENTS

| | | | | | |
|---|---|---|---|---|---|
| 3,675,935 | A | * | 7/1972 | Ludwig | F16J 15/342 277/400 |
| 4,523,764 | A | * | 6/1985 | Albers | F16J 15/406 277/400 |
| 4,645,414 | A | * | 2/1987 | DeHart | F04D 17/161 277/400 |

(Continued)

FOREIGN PATENT DOCUMENTS

DE    2444544 A1    4/1976
DE    3619489 A1    12/1987
(Continued)

OTHER PUBLICATIONS

International Search Report (ISR) dated Aug. 30, 2016, issued for International application No. PCT/JP2016/069062.
(Continued)

*Primary Examiner* — Nicholas L Foster
(74) *Attorney, Agent, or Firm* — Law Office of Katsuhiro Arai (57) ABSTRACT

In an embodiment, a pair of sliding components that slide relative to each other is included. One of the sliding components is a stationary-side seal ring 2, and the other sliding component is a rotating-side seal ring 3. The seal rings 2 and 3 have sliding faces S2 and S3 extending radially, respectively, for sealing sealed fluid against leakage. The sliding faces S2 and S3 are provided with a static pressure groove 22 communicating with a sealing gas supply passage, and pumping grooves 5 capable of controlling the radial flow of sealing gas to a flow from the low-pressure fluid side to the high-pressure fluid side by relative sliding of the sliding faces. By controlling the radial flow of sealing gas at the sliding face, the amount of flow of the sealing gas flowing to the low-pressure fluid side is reduced to improve sealing performance.

2 Claims, 6 Drawing Sheets

(56) References Cited

U.S. PATENT DOCUMENTS

| | | | |
|---|---|---|---|
| 7,744,094 B2* | 6/2010 | Yanagisawa | F16J 15/342 |
| | | | 277/399 |
| 9,494,239 B2* | 11/2016 | Hosoe | F16J 15/3412 |
| 9,964,215 B2* | 5/2018 | Itadani | F16J 15/3412 |
| 9,982,784 B2* | 5/2018 | Osada | F16J 15/3412 |
| 10,054,230 B2* | 8/2018 | Katori | F16J 15/34 |
| 2007/0296156 A1 | 12/2007 | Yanagisawa et al. | |
| 2014/0167361 A1* | 6/2014 | Osada | F16J 15/34 |
| | | | 277/400 |
| 2014/0167362 A1* | 6/2014 | Hosoe | F16J 15/3412 |
| | | | 277/400 |
| 2015/0184752 A1* | 7/2015 | Itadani | F16J 15/3412 |
| | | | 277/400 |
| 2015/0260292 A1 | 9/2015 | Inoue et al. | |
| 2017/0234431 A1* | 8/2017 | Katori | F16J 15/34 |
| | | | 277/400 |
| 2018/0073394 A1* | 3/2018 | Tokunaga | F01D 25/16 |
| 2018/0135699 A1* | 5/2018 | Tokunaga | F16J 15/3416 |
| 2018/0223997 A1* | 8/2018 | Itadani | F16J 15/3412 |
| 2018/0223998 A1* | 8/2018 | Itadani | F16J 15/3412 |

FOREIGN PATENT DOCUMENTS

| | | |
|---|---|---|
| JP | 2006022834 A | 1/2006 |
| JP | 2006077899 A | 3/2006 |
| JP | 4820471 B2 | 11/2011 |
| WO | 2014112455 A1 | 7/2014 |

OTHER PUBLICATIONS

Extended European Search Report (EESR) dated Jan. 31, 2019, issued for European counterpart patent application No. EP16817882.0. (4 pages).

* cited by examiner

SEALING DEVICE

This application is the U.S. National Phase under 35 U.S.C. § 371 of International Application PCT/JP2016/069062, filed Jun. 28, 2016, which claims priority to Japanese Patent Application No. 2015-131451, filed Jun. 30, 2015. The International Application was published under PCT Article 21(2) in a language other than English.

TECHNICAL FIELD

The present invention relates to a sealing device suitable for a shaft seal of a rotating apparatus or the like, and more particularly, relates to a non-contact hydrostatic sealing device configured to supply sealing gas to sliding faces of sliding components.

BACKGROUND ART

An invention known as a non-contact hydrostatic sealing device is, for example, a sealing device that supplies sealing gas between relative sliding faces of a pair of sliding components to seal between the relative sliding faces in a non-contact state, which includes a first seal ring disposed between the high-pressure fluid side and the low-pressure fluid side and having dynamic pressure generation grooves in a first sliding face, one of the sliding faces, a second seal ring having a second sliding face, the other of the sliding faces, which slides relative to the first sliding face, and a sealing gas supply passage that passes through the first sliding face of the first seal ring or the second sliding face of the second seal ring and can communicate with a fluid supply source, in which the dynamic pressure generation grooves in the first sliding face are provided with introduction passages that allow introduction of sealed fluid on the high-pressure side (see Patent Documents 1 and 2, for example).

In the invention of the sealing device described in Patent Documents 1 and 2 above, when sealing gas is supplied between the first sliding face and the second sliding face from the fluid supply source through the sealing gas supply passage, a floating gap of ten-odd micrometers is formed by static pressure generated between the sliding faces, and a sealing gas barrier is formed in the gap, thereby sealing gas in the apparatus. In the event that the sealing gas from the fluid supply source is not supplied between the sliding faces due to an accident or the like, the sealed fluid on the high-pressure side is guided to the dynamic pressure generation grooves in the first sliding face through the introduction passages, and the dynamic pressure generation grooves generate dynamic pressure, producing a gap between the sliding faces, and maintaining a non-contact state between the sliding faces.

CITATION LIST

Patent Documents

Patent Document 1: JP 2006-22834 A
Patent Document 2: JP 2006-77899 A

SUMMARY OF THE INVENTION

Problem to be Solved by the Invention

However, in conventional techniques described in Patent Documents 1 and 2 above, only the sealing gas supply passage and the dynamic pressure generation grooves are provided in the sliding faces, and thus sealing gas at a pressure higher than the pressure on the high-pressure fluid side flows to both the high-pressure fluid side and the low-pressure fluid side. At that time, the larger amount of sealing gas flows to the low-pressure fluid side, so that the sealed fluid on the high-pressure fluid side tends to leak to the low-pressure fluid side, disadvantageously reducing sealing performance.

It is an object of the present invention to provide a sealing device capable of reducing the amount of flow of sealing gas flowing to the low-pressure fluid side and improving sealing performance by controlling, at sliding faces of a pair of sliding components sliding relatively, the radial flow of the sealing gas supplied to the sliding faces.

Means for Solving Problem

To attain the above object, a sealing device according to a first aspect of the present invention includes a pair of sliding components that slide relative to each other, one of the sliding components being a stationary-side seal ring, the other of the sliding components being a rotating-side seal ring, the seal rings each having a sliding face extending radially for sealing sealed fluid against leakage, the sliding faces of the pair of sliding components being provided with a static pressure groove communicating with a sealing gas supply passage, and pumping grooves capable of controlling a radial flow of sealing gas to a flow from a low-pressure fluid side to a high-pressure fluid side by relative sliding of the sliding faces.

According to this aspect, the amount of flow of the sealing gas flowing to the low-pressure fluid side is reduced, leakage of the sealed fluid can be reduced, and sealing performance can be improved.

According to a second aspect of the present invention, in the sealing device in the first aspect, the pumping grooves are located on the low-pressure fluid side of the static pressure groove, and are spiral grooves disposed such that upstream ends communicate with the low-pressure fluid side and downstream ends are isolated from the static pressure groove by a land portion.

According to this aspect, the amount of flow of the sealing gas flowing to the low-pressure fluid side is reduced, leakage of the sealed fluid can be reduced, and sealing performance can be improved. In addition, dynamic pressure (positive pressure) is generated at Rayleigh steps of the downstream ends of the spiral grooves, so that a gap between the sliding face of the stationary-side seal ring and the sliding face of the rotating-side seal ring is widened. Thus, even when the amount of supply of the sealing gas is reduced, a non-contact hydrostatic sealing function can be maintained.

According to a third aspect of the present invention, in the sealing device in the first aspect, the pumping grooves are located on the low-pressure fluid side of the static pressure groove, and are spiral grooves disposed such that upstream ends are isolated from the low-pressure fluid side by a land portion and downstream ends communicate with the static pressure groove.

According to this aspect, the amount of flow of the sealing gas flowing to the low-pressure fluid side is reduced, leakage of the sealed fluid can be reduced, and sealing performance can be improved. In addition, since the land portion is present continuously in the vicinity of the inner diameter of the sliding faces, sealing performance can be further enhanced.

According to a fourth aspect of the present invention, in the sealing device in the first aspect, the pumping grooves are located on the high-pressure fluid side of the static pressure groove, and are spiral grooves disposed such that upstream ends are isolated from the static pressure groove by a land portion and downstream ends communicate with the high-pressure fluid side.

According to this aspect, the pressure flow of the sealing gas flowing out from the static pressure groove to the outer peripheral side increases, and by the amount of the increase, the amount of flow to the low-pressure fluid side of the sealing gas flowing to the inner peripheral side is reduced, so that leakage of the sealed fluid can be reduced, and sealing performance can be improved.

According to a fifth aspect of the present invention, in the sealing device in the first aspect, the pumping grooves are located on the high-pressure fluid side of the static pressure groove, and are spiral grooves disposed such that upstream ends communicate with the static pressure groove and downstream ends are isolated from the high-pressure fluid side by a land portion.

According to this aspect, the pressure flow of the sealing gas flowing out from the static pressure groove to the outer peripheral side increases, and by the amount of the increase, the amount of flow to the low-pressure fluid side of the sealing gas flowing to the inner peripheral side is reduced, so that leakage of the sealed fluid can be reduced, and sealing performance can be improved.

In addition, dynamic pressure (positive pressure) is generated at Rayleigh steps of the downstream ends of the spiral grooves, so that a gap between the sliding face of the stationary-side seal ring and the sliding face of the rotating-side seal ring is widened. Thus, even when the amount of supply of the sealing gas is reduced, a non-contact hydrostatic sealing function can be maintained.

According to a sixth aspect of the present invention, in the sealing device in the first aspect, the pumping grooves are formed by low-pressure fluid-side pumping grooves located on the low-pressure fluid side of the static pressure groove and high-pressure fluid-side pumping grooves located on the high-pressure fluid side of the static pressure groove, the low-pressure fluid-side pumping grooves are spiral grooves disposed such that upstream ends are isolated from the low-pressure fluid side by a land portion and downstream ends communicate with the static pressure groove, and the high-pressure fluid-side pumping grooves are spiral grooves disposed such that upstream ends communicate with the static pressure groove and downstream ends are isolated from the high-pressure fluid side by a land portion.

According to this aspect, the spiral grooves constituting the low-pressure fluid-side pumping grooves force the sealing gas supplied from the static pressure groove and flowing toward the low-pressure fluid side to leak, back to the high-pressure fluid side, and the spiral grooves constituting the high-pressure fluid-side pumping grooves reduce pressure on the outer peripheral side of the sliding faces, increasing the pressure flow of the sealing gas flowing out from the static pressure groove to the outer peripheral side, and by the amount of the increase, the amount of flow to the low-pressure fluid side of the sealing gas flowing to the inner peripheral side is reduced, so that leakage of the sealed fluid can be further reduced, and sealing performance can be further improved.

In addition, dynamic pressure (positive pressure) is generated at Rayleigh steps of the downstream ends of the spiral grooves constituting the high-pressure fluid-side pumping grooves, so that a gap between the sliding face of the stationary-side seal ring and the sliding face of the rotating-side seal ring is widened. Thus, even when the amount of supply of the sealing gas is reduced, a non-contact hydrostatic sealing function can be maintained.

Effects of the Invention

The present invention achieves the following outstanding effects.
(1) The sliding faces of the pair of sliding components are provided with the static pressure groove communicating with the sealing gas supply passage, and the pumping grooves capable of controlling the radial flow of the sealing gas to a flow from the low-pressure fluid side to the high-pressure fluid side by relative sliding of the sliding faces, so that the amount of flow of the sealing gas flowing to the low-pressure fluid side is reduced, leakage of the sealed fluid can be reduced, and sealing performance can be improved.
(2) The pumping grooves are located on the low-pressure fluid side of the static pressure groove, and are the spiral grooves disposed such that the upstream ends communicate with the low-pressure fluid side and the downstream ends are isolated from the static pressure groove by the land portion, so that the amount of flow of the sealing gas flowing to the low-pressure fluid side is reduced, leakage of the sealed fluid can be reduced, and sealing performance can be improved. In addition, dynamic pressure (positive pressure) is generated at the Rayleigh steps of the downstream ends of the spiral grooves, so that the gap between the sliding face of the stationary-side seal ring and the sliding face of the rotating-side seal ring is widened. Thus, even when the amount of supply of the sealing gas is reduced, the non-contact hydrostatic sealing function can be maintained.
(3) The pumping grooves are located on the low-pressure fluid side of the static pressure groove, and are the spiral grooves disposed such that the upstream ends are isolated from the low-pressure fluid side by the land portion and the downstream ends communicate with the static pressure groove, so that the amount of flow of the sealing gas flowing to the low-pressure fluid side is reduced, leakage of the sealed fluid can be reduced, and sealing performance can be improved. In addition, since the land portion is present continuously in the vicinity of the inner diameter of the sliding faces, sealing performance can be further enhanced.
(4) The pumping grooves are located on the high-pressure fluid side of the static pressure groove, and are the spiral grooves disposed such that the upstream ends are isolated from the static pressure groove by the land portion and the downstream ends communicate with the high-pressure fluid side, so that the pressure flow of the sealing gas flowing out from the static pressure groove to the outer peripheral side increases, and by the amount of the increase, the amount of flow to the low-pressure fluid side of the sealing gas flowing to the inner peripheral side is reduced. Thus leakage of the sealed fluid can be reduced, and sealing performance can be improved.
(5) The pumping grooves are located on the high-pressure fluid side of the static pressure groove, and are the spiral grooves disposed such that the upstream ends communicate with the static pressure groove and the downstream ends are isolated from the high-pressure fluid side by the land portion, so that the pressure flow of the sealing gas flowing out from the static pressure groove to the outer peripheral side increases, and by the amount of the increase, the amount of flow to the low-pressure fluid side of the sealing gas flowing to the inner peripheral side is reduced. Thus leakage of the sealed fluid can be reduced, and sealing performance can be improved.

In addition, dynamic pressure (positive pressure) is generated at the Rayleigh steps of the downstream ends of the spiral grooves, so that the gap between the sliding face of the stationary-side seal ring and the sliding face of the rotating-side seal ring is widened. Thus, even when the amount of supply of the sealing gas is reduced, the non-contact hydrostatic sealing function can be maintained.

(6) The pumping grooves are formed by the low-pressure fluid-side pumping grooves located on the low-pressure fluid side of the static pressure groove and the high-pressure fluid-side pumping grooves located on the high-pressure fluid side of the static pressure groove, the low-pressure fluid-side pumping grooves are the spiral grooves disposed such that the upstream ends are isolated from the low-pressure fluid side by the land portion and the downstream ends communicate with the static pressure groove, and the high-pressure fluid-side pumping grooves are the spiral grooves disposed such that the upstream ends communicate with the static pressure groove and the downstream ends are isolated from the high-pressure fluid side by the land portion, so that the spiral grooves constituting the low-pressure fluid-side pumping grooves force the sealing gas supplied from the static pressure groove and flowing toward the low-pressure fluid side to leak, back to the high-pressure fluid side, and the spiral grooves constituting the high-pressure fluid-side pumping grooves reduce pressure on the outer peripheral side of the sliding faces, increasing the pressure flow of the sealing gas flowing out from the static pressure groove to the outer peripheral side, and by the amount of the increase, the amount of flow to the low-pressure fluid side of the sealing gas flowing to the inner peripheral side is reduced. Thus, leakage of the sealed fluid can be further reduced, and sealing performance can be further improved.

In addition, dynamic pressure (positive pressure) is generated at the Rayleigh steps of the downstream ends of the spiral grooves constituting the high-pressure fluid-side pumping grooves, so that the gap between the sliding face of the stationary-side seal ring and the sliding face of the rotating-side seal ring is widened. Thus, even when the amount of supply of the sealing gas is reduced, the non-contact hydrostatic sealing function can be maintained.

BRIEF DESCRIPTION OF THE DRAWINGS

FIG. 3(*a*) shows a sliding face of a rotating-side seal ring of a sealing device according to a second embodiment of the present invention, with the inner diameter and the outer diameter of a stationary-side seal ring and a static pressure groove formed in a sliding face thereof indicated by chain double-dashed lines. FIG. 3(*b*) is a vertical cross-sectional view showing a sliding portion.

FIG. 4(*a*) shows a sliding face of a rotating-side seal ring of a sealing device according to a third embodiment of the present invention, with the inner diameter and the outer diameter of a stationary-side seal ring and a static pressure groove formed in a sliding face thereof indicated by chain double-dashed lines. FIG. 4(*b*) is a vertical cross-sectional view showing a sliding portion.

FIG. 5(*a*) shows a sliding face of a rotating-side seal ring of a sealing device according to a fourth embodiment of the present invention, with the inner diameter and the outer diameter of a stationary-side seal ring and a static pressure groove formed in a sliding face thereof indicated by chain double-dashed lines. FIG. 5(*b*) is a vertical cross-sectional view showing a sliding portion.

FIG. 6(*a*) shows a sliding face of a rotating-side seal ring of a sealing device according to a fifth embodiment of the present invention, with the inner diameter and the outer diameter of a stationary-side seal ring and a static pressure groove formed in a sliding face thereof indicated by chain double-dashed lines. FIG. 6(*b*) is a vertical cross-sectional view showing a sliding portion.

DESCRIPTION OF EMBODIMENTS

Hereinafter with reference to the drawings, forms for implementing this invention will be described illustratively based on embodiments. However, the dimensions, materials, shapes, relative arrangements, and others of components described in the embodiments are not intended to limit the scope of the present invention only to them unless otherwise explicitly described.

First Embodiment

Figure 1:
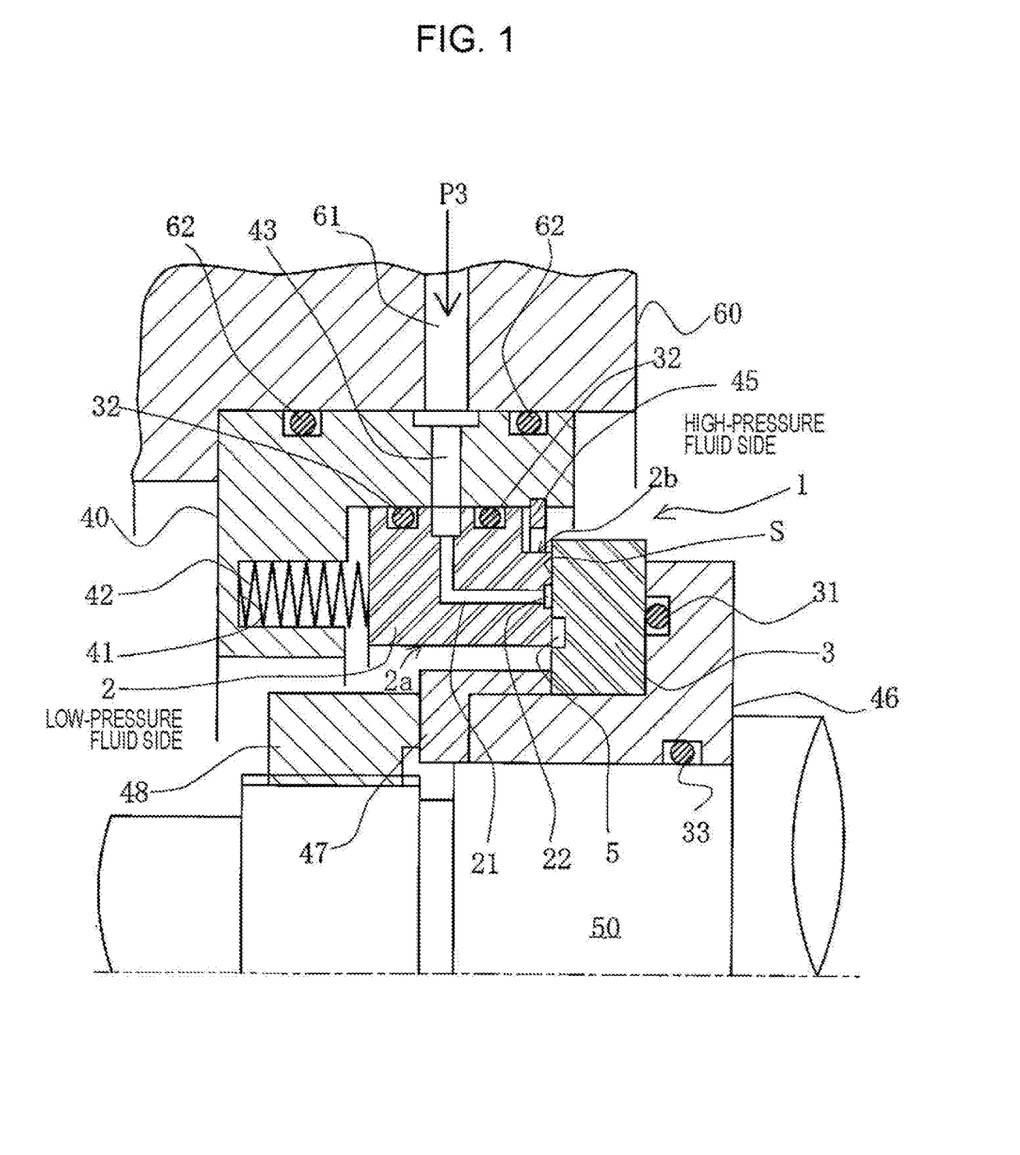
FIG. 1 is an upper-half vertical cross-sectional view showing an example of a sealing device according to a first embodiment of the present invention.
Figure 2:
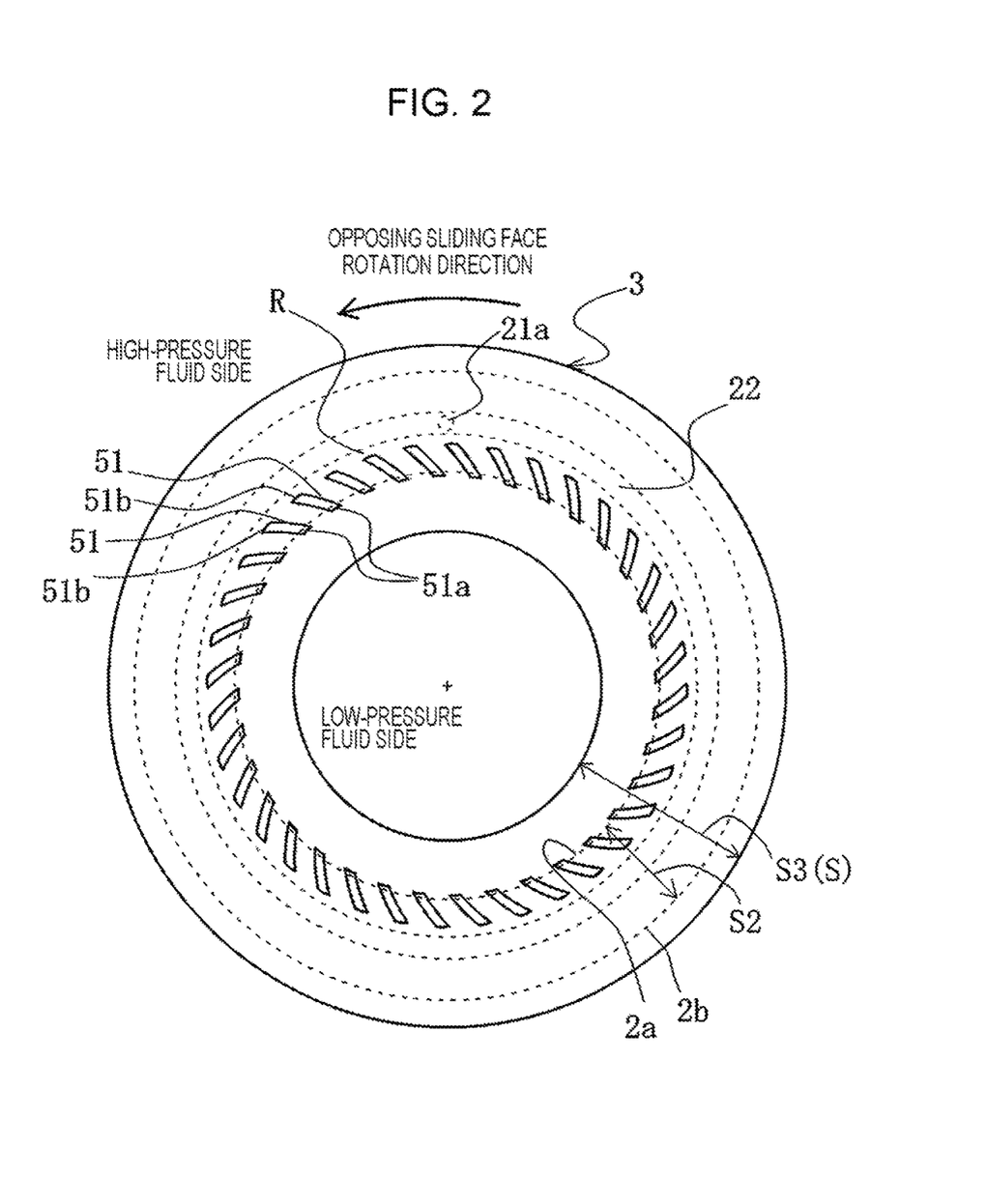
FIG. 2 shows a sliding face of a rotating-side seal ring of the sealing device according to the first embodiment of the present invention, with the inner diameter and the outer diameter of a stationary-side seal ring and a static pressure groove formed in a sliding face thereof indicated by chain double-dashed lines.

With reference to FIGS. 1 and 2, a sealing device according to a first embodiment of the present invention will be described.

In the embodiments below, an inside seal with the outer peripheral side of sliding components constituting a sealing device as the sealed-fluid side (high-pressure fluid side), and the inner peripheral side thereof as the low-pressure fluid side will be described. However, the present invention is not limited to this, and is also applicable to a case of an outside seal with the outer peripheral side as the low-pressure fluid side and the inner peripheral side as the sealed-fluid side (high-pressure fluid side). A case where a static pressure groove is formed in a sliding face of a stationary-side seal ring, and pumping grooves are formed in a sliding face of a rotating-side seal ring will be described. However, the present invention is not limited to this. It is essential only that a static pressure groove and pumping grooves be formed in at least one of the stationary-side seal ring and the rotating-side seal ring.

In FIG. 1, a sealing device 1 is mounted between a rotating shaft 50 and a housing 60. An L-shaped cross-section ring-shaped holder 40 is fitted in a stepped hole of the housing 60, and is sealed by two O-rings 62 arranged in parallel. Further, a stationary-side seal ring 2 is disposed axially movably at the peripheral surface of an inner peripheral hole of the holder 40, and is sealed by two O-rings 32. A snap ring 45 is provided to prevent the stationary-side seal ring 2 from being removed from the inner peripheral hole.

A plurality of holes 41 is provided at equal intervals along the inner peripheral hole side of the holder 40. A spring 42 is disposed in each hole 41. The springs 42 resiliently press the stationary-side seal ring 2 to the side of a rotating-side seal ring 3. The stationary-side seal ring 2 is locked in the holder 40 by rotation-prevention pins, which is not shown.

A sleeve 46 is fixed to the rotating shaft 50 via an O-ring 33. The rotating-side seal ring 3 is fitted in a step of the sleeve 46, and is sealed by an O-ring 31 provided in a side peripheral surface. The rotating-side seal ring 3 is fixed to the step of the sleeve 46 by a first retainer 47. Further, the sleeve 46 and the first retainer 47 are fixed to the rotating shaft 50 via a second retainer 48. The second retainer 48 and the rotating shaft 50 are screwed to each other to clamp and fix the sleeve 46 and the first retainer 47.

The materials of the stationary-side seal ring 2 and the rotating-side seal ring 3 are selected from silicon carbide (SiC) excellent in wear resistance, carbon excellent in self-lubricity, and the like. For example, both may be SiC, or a combination of one of them being SiC and the other being carbon is possible.

In this example, the outer diameter of the rotating-side seal ring 3 is set larger than the outer diameter of the stationary-side seal ring 2, and the inner diameter of the rotating-side seal ring 3 is set smaller than the inner diameter of the stationary-side seal ring 2. The width of a sliding face S3 of the rotating-side seal ring 3 is larger than the width of a sliding face S2 of the stationary-side seal ring 2. Thus, the width of sliding faces at which the sliding face S2 of the stationary-side seal ring 2 and the sliding face S3 of the rotating-side seal ring 3 actually relatively slide is the width of the sliding face S2 of the stationary-side seal ring 2.

Hereinafter, the sliding faces actually relatively sliding are referred to as "sliding faces S."

The relative dimensions of the outer diameters and the inner diameters of the seal rings 2 and 3 may be opposite to those described above.

Communicating paths 61 and 43 communicating with each other are provided in the housing 60 and the holder 40, respectively. The communicating paths 61 and 43 are communicated with a sealing gas supply passage 21 provided in the stationary-side seal ring 2 and bent at substantially a right angle. A sealing gas supply pipe connected to a sealing gas supply source (not shown) is connected to the communicating path 61 of the housing 60. Further, the sealing gas supply passage 21 is communicated with a static pressure groove 22 formed in the sliding face S2 of the stationary-side seal ring 2. The static pressure groove 22 is rectangular-shaped in cross section, and is provided circumferentially continuously, positioned at substantially the radial center of the sliding face S.

The static pressure groove 22 is not limited to be provided circumferentially continuously, and may be a plurality of arc-shaped grooves of an equal length disposed circumferentially at regular intervals.

The position in which the static pressure groove 22 is formed may be, other than substantially the radial center of the sliding face S, offset toward either the low-pressure fluid side or the high-pressure fluid side.

When the pressure of sealed fluid inside the apparatus, that is, pressure on the high-pressure fluid side is P1, pressure on the low-pressure fluid side outside the apparatus from the sealing device 1 is P2, and the pressure of the sealing gas is P3, the pressure P3 of the sealing gas is set equal to or higher than the pressure P1 on the high-pressure fluid side, and higher than the pressure P2 on the low-pressure fluid side.

As the sealing gas, for example, nitrogen gas is used.

In this configuration, the sealing gas supplied through the communicating paths 61 and 43 is supplied to the static pressure groove 22 through the sealing gas supply passage 21, and flows out from the static pressure groove 22 toward the inner peripheral side and the outer peripheral side, passing through a gap between the stationary-side seal ring 2 and the rotating-side seal ring 3, and the rotating shaft 50 rotates with the stationary-side seal ring 2 pressed and biased toward the rotating-side seal ring 3 by the resilient force of the springs 42. As a result, a biasing force by the springs 42 is balanced with a pushing-away pressure by sealing gas emission, the gap between the two seal rings 2 and 3 is automatically adjusted, and the sealing gas functions as a sealing lubrication film, exhibiting a non-contact hydrostatic sealing function.

FIG. 2 shows in solid lines the sliding face S3 of the rotating-side seal ring 3 of the sealing device in FIG. 1, with the static pressure groove 22 formed in the sliding face S2 of the stationary-side seal ring 2, an opening 21a of the sealing gas supply passage 21, and the inner diameter 2a and the outer diameter 2b of the stationary-side seal ring 2 indicated by chain double-dashed lines.

As shown in FIG. 2, in this example, the static pressure groove 22 is a circumferential groove formed continuously in the entire circumference. The opening 21a of the sealing gas supply passage 21 is communicated with a desired portion of the static pressure groove 22. Sealing gas supplied from the opening 21a is supplied through the static pressure groove 22 to the entire circumference of the sliding faces S sliding relatively, flowing out toward the inner peripheral side (low-pressure fluid side) and the outer peripheral side (high-pressure fluid side).

The sliding face S3 of the rotating-side seal ring 3 is provided with pumping grooves 5 for controlling the radial flow of the sealing gas supplied from the static pressure groove 22, to a flow from the low-pressure fluid side to the high-pressure fluid side by the relative sliding of the two sliding faces S2 and S3.

In FIG. 2, assume that the opposing sliding face rotates in a counterclockwise direction as shown by an arrow. The pumping grooves 5 are located radially on the low-pressure fluid side of the static pressure groove 22, and are spiral-shaped grooves disposed such that upstream ends 5a communicate with the low-pressure fluid side and downstream ends 5b are isolated from the static pressure groove 22 by a land portion (a smooth portion of the sliding face) R, and inclined so as to force back the sealing gas present between the sliding faces from the low-pressure fluid side to the high-pressure fluid side by the relative sliding (hereinafter, referred to as "spiral grooves").

In FIG. 2, thirty-six spiral grooves 51 constituting the pumping grooves 5 are spaced circumferentially evenly, but are not limited to this. It is essential only that one or more spiral grooves 51 be provided.

The width, depth, spiral angle, and length of the spiral grooves 51 are determined in terms of design, with the diameter, width, and relative sliding speed of a sliding face, and the properties of sealing gas taken into consideration.

Now, when sealing gas is supplied from the static pressure groove 22, and the rotating shaft 50 is driven to be rotated, the rotating-side seal ring 3 rotates, and the sliding face S2 of the stationary-side seal ring 2 and the sliding face S3 of the rotating-side seal ring 3 slide relatively. This relative sliding causes the spiral grooves 51 to act to convey fluid flowing into the spiral grooves 51 to the high-pressure fluid side, thus forcing the sealing gas supplied from the static pressure groove 22 and flowing toward the low-pressure fluid side to leak, back to the high-pressure fluid side. Consequently, the amount of flow of the sealing gas flowing to the low-pressure fluid side is reduced, leakage of the sealed fluid can be reduced, and sealing performance can be improved.

At that time, dynamic pressure (positive pressure) is generated at Rayleigh steps of the downstream ends 51b of the spiral grooves 51, so that the gap between the sliding face S2 of the stationary-side seal ring 2 and the sliding face S3 of the rotating-side seal ring 3 is widened. Thus, even when the amount of supply of the sealing gas is reduced, the non-contact hydrostatic sealing function can be maintained.

When the sealing device is at rest, the sealed fluid does not leak because a continuous land portion R is formed at the sliding faces S on the high-pressure fluid side of the static pressure groove 22.

The configuration in the first embodiment described above achieves the following effects.

(1) A pair of sliding components sliding relative to each other is included. One of the sliding components is the stationary-side seal ring 2, and the other sliding component is the rotating-side seal ring 3. The seal rings 2 and 3 have the sliding faces S2 and S3 extending radially, respectively, to seal sealed fluid against leakage. The sliding faces S2 and S3 of the pair of sliding components 2 and 3 are provided with the static pressure groove 22 communicating with the sealing gas supply passage and the pumping grooves 5 capable of controlling the radial flow of sealing gas to a flow from the low-pressure fluid side to the high-pressure fluid side by the relative sliding of the two sliding faces S2 and S3, so that the amount of flow of the sealing gas flowing to the low-pressure fluid side is reduced, leakage of the sealed fluid can be reduced, and sealing performance can be improved.

(2) The pumping grooves 5 are located on the low-pressure fluid side of the static pressure groove 22, and are the spiral grooves 51 disposed such that the upstream ends 51a communicate with the low-pressure fluid side and the downstream ends 51b are isolated from the static pressure groove 22 by the land portion R, so that dynamic pressure (positive pressure) is generated at the Rayleigh steps of the downstream ends 51b of the spiral grooves 51, thus widening the gap between the sliding face S2 of the stationary-side seal ring 2 and the sliding face S3 of the rotating-side seal ring 3. Even when the amount of supply of the sealing gas is reduced, the non-contact hydrostatic sealing function can be maintained.

Second Embodiment

Figure 3A:
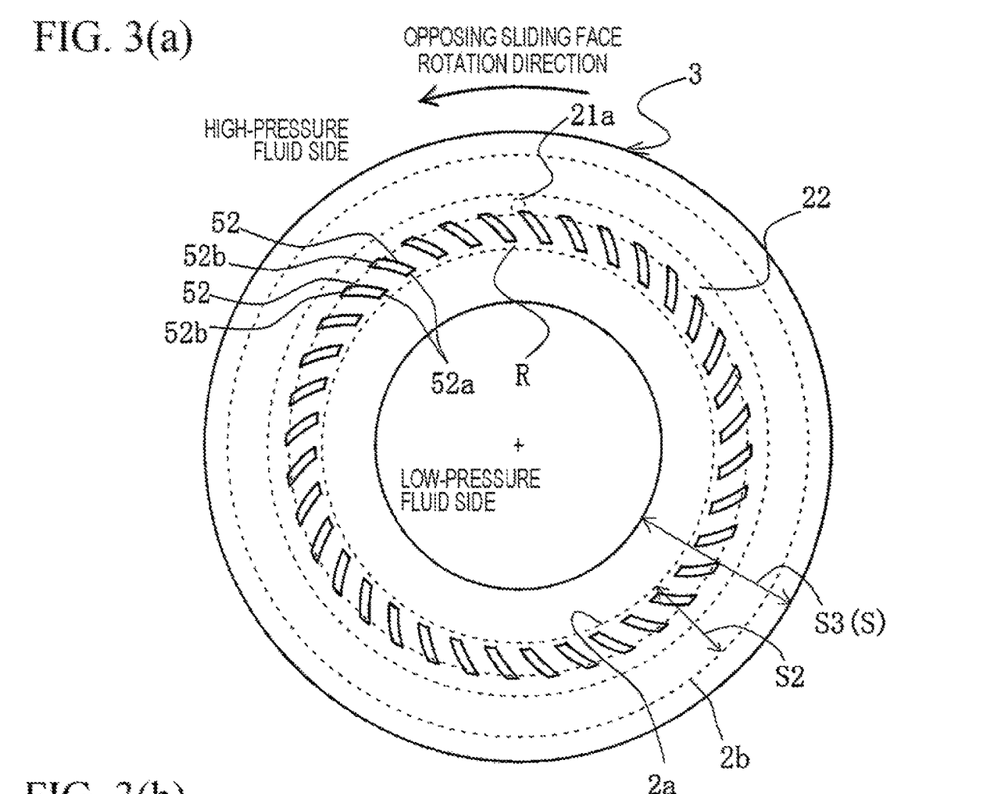
Figure 3B:
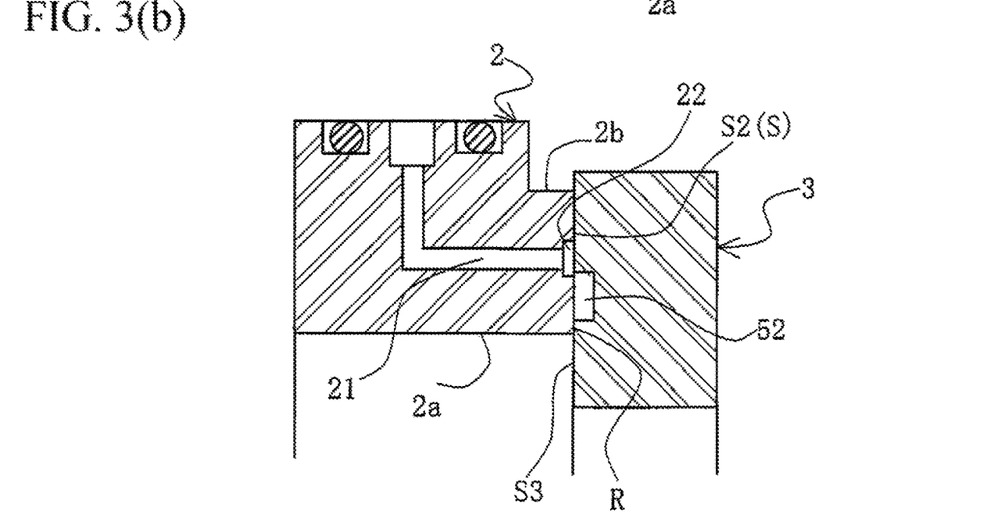

With reference to FIG. 3, a sealing device according to a second embodiment of the present invention will be described.

The sealing device according to the second embodiment is different from the sealing device in the first embodiment in the position where spiral grooves constituting pumping grooves 5 are disposed. Other basic configuration is identical to that in the first embodiment, and the same members are given the same reference numerals and letters to omit redundant descriptions.

In FIG. 3, thirty-six spiral grooves 52 constituting the pumping grooves 5 are located on the low-pressure fluid side of a static pressure groove 22, and are disposed such that upstream ends 52a are isolated from the low-pressure fluid side by a land portion R and downstream ends 52b communicate with the static pressure groove 22.

In FIG. 3, the spiral grooves 52 constituting the pumping grooves 5 are spaced circumferentially evenly, but are not limited to this. It is essential only that one or more spiral grooves 52 be provided.

The width, depth, spiral angle, and length of the spiral grooves 52 are determined in terms of design, with the diameter, width, and relative sliding speed of a sliding face, and the properties of sealing gas taken into consideration.

Now, when sealing gas is supplied from the static pressure groove 22, and a rotating shaft 50 is driven to be rotated, a rotating-side seal ring 3 rotates, and a sliding face S2 of a stationary-side seal ring 2 and a sliding face S3 of the rotating-side seal ring 3 slide relatively. This relative sliding causes the spiral grooves 52 to act to convey fluid flowing into the spiral grooves 52 to the high-pressure fluid side, thus forcing the sealing gas supplied from the static pressure groove 22 and flowing toward the low-pressure fluid side to leak, back to the high-pressure fluid side. Consequently, the amount of flow of the sealing gas flowing to the low-pressure fluid side is reduced, leakage of sealed fluid can be reduced, and sealing performance can be improved.

At that time, no dynamic pressure (positive pressure) is generated because Rayleigh steps are not formed at the downstream ends 52b. Thus, it is required to make the amount of supply of the sealing gas larger than in the first embodiment. However, in addition to the presence of the sealing gas, a land portion R is present circumferentially continuously in the vicinity of the inner diameter of the sliding faces sliding relatively, so that sealing performance is higher than in the first embodiment.

When the sealing device is at rest, the sealed fluid does not leak because a continuous land portion R is formed at the sliding faces S on the high-pressure fluid side of the static pressure groove 22.

The configuration in the second embodiment described above achieves the following effects.

The pumping grooves 5 are located on the low-pressure fluid side of the static pressure groove 22, and are the spiral grooves 52 disposed such that the upstream ends 52a are isolated from the low-pressure fluid side by the land portion R and the downstream ends 52b communicate with the static pressure groove 22, so that the amount of flow of the sealing gas flowing to the low-pressure fluid side is reduced, leakage of the sealed fluid can be reduced, and sealing performance can be improved. Further, since the land portion R is present continuously in the vicinity of the inner diameter of the sliding faces, sealing performance can be further enhanced.

Third Embodiment

Figure 4A:
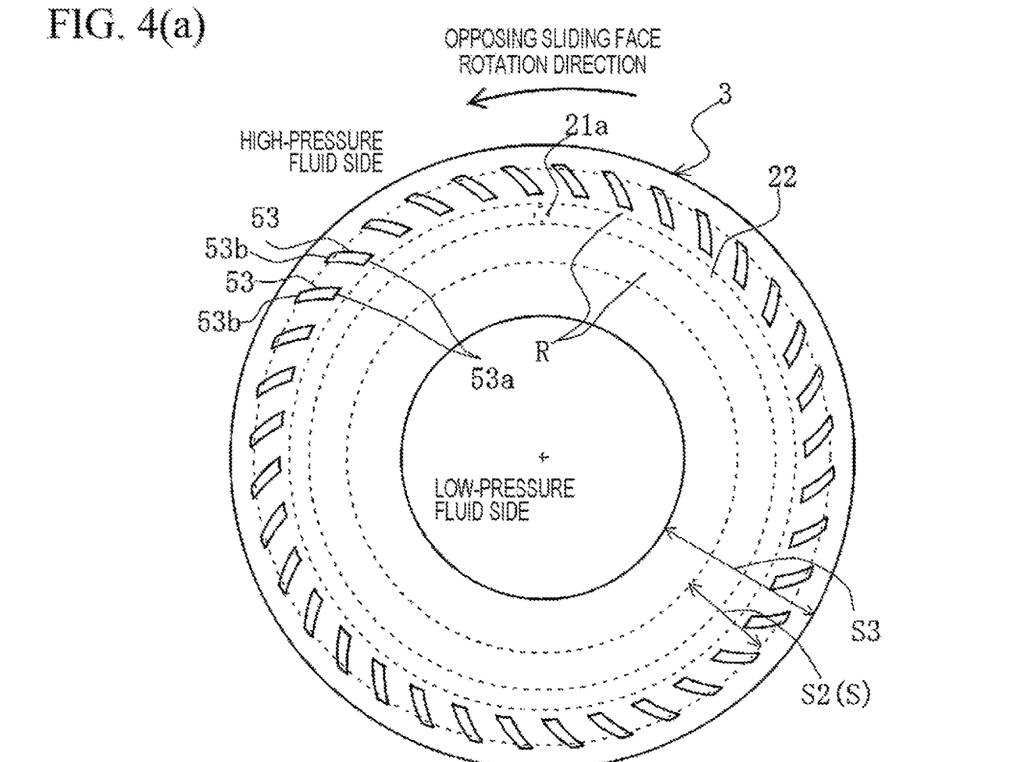
Figure 4B:
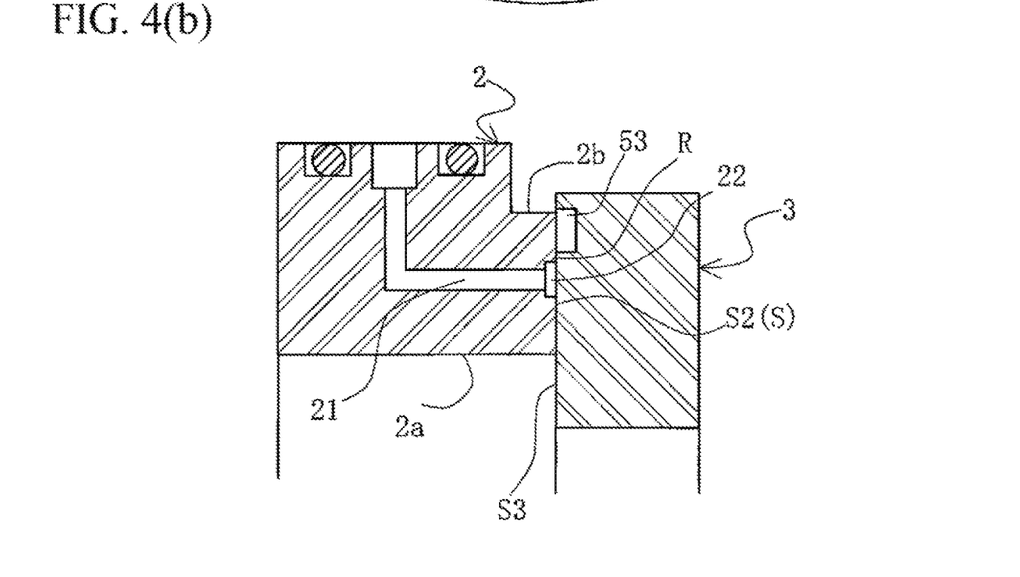

With reference to FIG. 4, a sealing device according to a third embodiment of the present invention will be described.

The sealing device according to the third embodiment is different from the sealing device in the first embodiment in the position where spiral grooves constituting pumping grooves 5 are disposed. Other basic configuration is identical to that in the first embodiment, and the same members are given the same reference numerals and letters to omit redundant descriptions.

In FIG. 4, thirty-six spiral grooves 53 constituting the pumping grooves 5 are located on the high-pressure fluid side of a static pressure groove 22, and are disposed such that upstream ends 53a are isolated from the static pressure groove 22 by a land portion R and downstream ends 53b communicate with the high-pressure fluid side.

In FIG. 4, the spiral grooves 53 constituting the pumping grooves 5 are spaced circumferentially evenly, but are not limited to this. It is essential only that one or more spiral grooves 53 be provided.

The width, depth, spiral angle, and length of the spiral grooves 53 are determined in terms of design, with the diameter, width, and relative sliding speed of a sliding face, and the properties of sealing gas taken into consideration.

Now, when sealing gas is supplied from the static pressure groove 22, and a rotating shaft 50 is driven to be rotated, a rotating-side seal ring 3 rotates, and a sliding face S2 of a stationary-side seal ring 2 and a sliding face S3 of the rotating-side seal ring 3 slide relatively. This relative sliding causes the spiral grooves 53 to act to convey fluid flowing into the spiral grooves 53 to the high-pressure fluid side, thus reducing pressure on the outer peripheral side of the sliding faces S2 and S3 provided with the spiral grooves 53. Consequently, the pressure flow of the sealing gas flowing out from the static pressure groove 22 to the outer peripheral side increases. By the amount of the increase, the amount of flow to the low-pressure fluid side of the sealing gas flowing to the inner peripheral side is reduced, leakage of sealed fluid can be reduced, and sealing performance can be improved.

At that time, no dynamic pressure (positive pressure) is generated because Rayleigh steps are not formed at the downstream ends 53b of the spiral grooves 53. Thus, it is required to make the amount of supply of the sealing gas larger than in the first embodiment. However, in addition to the presence of the sealing gas, a land portion R is present circumferentially continuously on the inner diameter side of the sliding faces sliding relatively, so that sealing performance is higher than in the first embodiment.

When the sealing device is at rest, the sealed fluid does not leak since the continuous land portion R is formed at the sliding faces S on the low-pressure fluid side of the static pressure groove 22.

The configuration in the third embodiment described above achieves the following effects.

The pumping grooves 5 are located on the high-pressure fluid side of the static pressure groove 22, and are the spiral grooves 53 disposed such that the upstream ends 53a are isolated from the static pressure groove 22 by the land portion R and the downstream ends 53b communicate with the high-pressure fluid side, so that the pressure flow of the sealing gas flowing out from the static pressure groove 22 to the outer peripheral side increases. By the amount of the increase, the amount of flow to the low-pressure fluid side of the sealing gas flowing to the inner peripheral side is reduced, leakage of sealed fluid can be reduced, and sealing performance can be improved.

When the sealing device is at rest, the sealed fluid does not leak since the continuous land portion R is formed at the sliding faces S on the low-pressure fluid side of the static pressure groove 22.

Fourth Embodiment

Figure 5A:
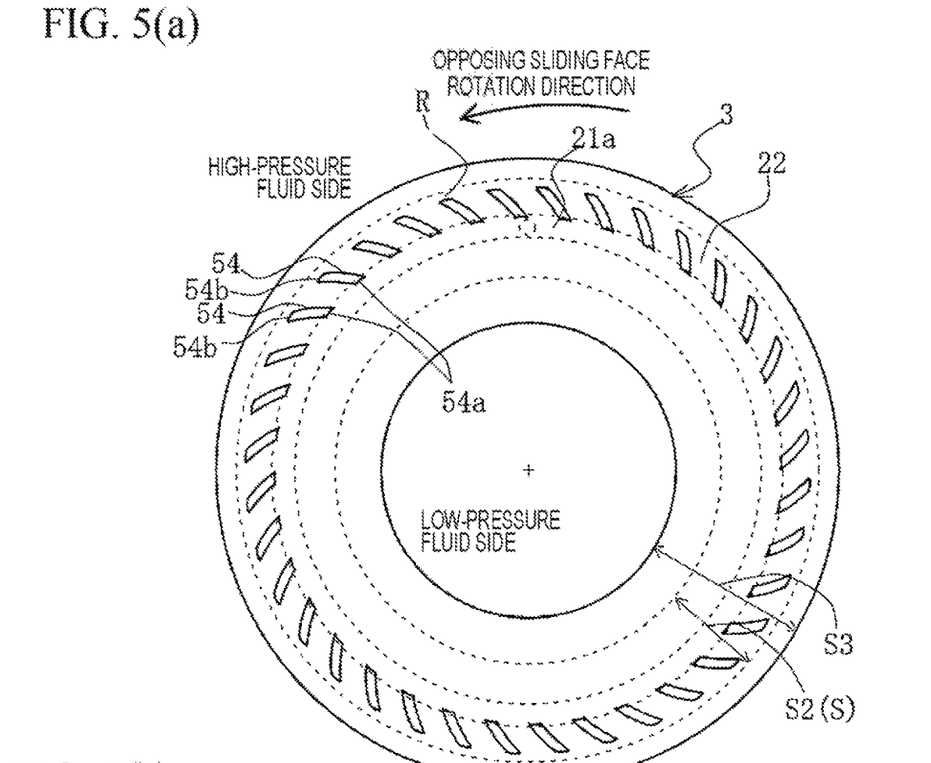
Figure 5B:
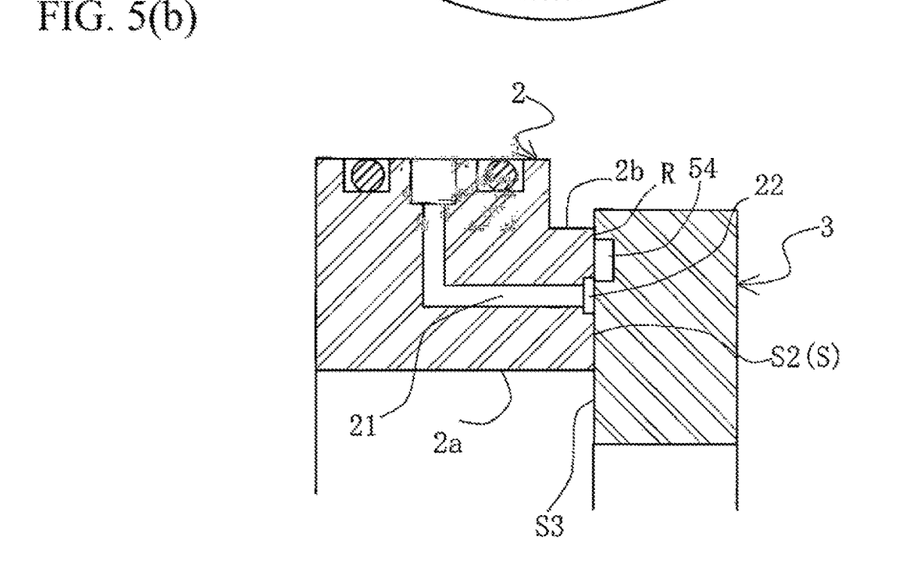

With reference to FIG. 5, a sealing device according to a fourth embodiment of the present invention will be described.

The sealing device according to the fourth embodiment is different from the sealing device in the first embodiment in the position where spiral grooves constituting pumping grooves 5 are disposed. Other basic configuration is identical to that in the first embodiment, and the same members are given the same reference numerals and letters to omit redundant descriptions.

In FIG. 5, thirty-six spiral grooves 54 constituting the pumping grooves 5 are located on the high-pressure fluid side of a static pressure groove 22, and are disposed such that upstream ends 54a communicate with the static pressure groove 22 and downstream ends 54b are isolated from the high-pressure fluid side by a land portion R.

In FIG. 5, the spiral grooves 54 constituting the pumping grooves 5 are spaced circumferentially evenly, but are not limited to this. It is essential only that one or more spiral grooves 54 be provided.

The width, depth, spiral angle, and length of the spiral grooves 54 are determined in terms of design, with the diameter, width, and relative sliding speed of a sliding face, and the properties of sealing gas taken into consideration.

Now, when sealing gas is supplied from the static pressure groove 22, and a rotating shaft 50 is driven to be rotated, a rotating-side seal ring 3 rotates, and a sliding face S2 of a stationary-side seal ring 2 and a sliding face S3 of the rotating-side seal ring 3 slide relatively. This relative sliding causes the spiral grooves 54 to act to convey fluid flowing into the spiral grooves 54 to the high-pressure fluid side, thus reducing pressure on the outer peripheral side of the sliding faces S2 and S3 provided with the spiral grooves 54. Consequently, the pressure flow of the sealing gas flowing out from the static pressure groove 22 to the outer peripheral side increases. By the amount of the increase, the amount of flow to the low-pressure fluid side of the sealing gas flowing to the inner peripheral side is reduced, leakage of sealed fluid can be reduced, and sealing performance can be improved.

A land portion R is present circumferentially continuously on the inner diameter side of the sliding faces sliding relatively, and thus sealing performance is higher than in the first embodiment.

Further, at that time, dynamic pressure (positive pressure) is generated at Rayleigh steps of the downstream ends 54b of the spiral grooves 54, so that a gap between the sliding face S2 of the stationary-side seal ring 2 and the sliding face S3 of the rotating-side seal ring 3 is widened. Thus, even when the amount of supply of the sealing gas is reduced, a non-contact hydrostatic sealing function can be maintained.

When the sealing device is at rest, sealed fluid does not leak since the continuous land portion R is formed at the sliding faces S on the low-pressure fluid side of the static pressure groove 22.

The configuration in the fourth embodiment described above achieves the following effects.

(1) The pumping grooves 5 are located on the high-pressure fluid side of the static pressure groove 22, and are the spiral grooves 54 disposed such that the upstream ends 54a communicate with the static pressure groove 22 and the downstream ends 54b are isolated from the high-pressure fluid side by the land portion R, so that the pressure flow of the sealing gas flowing out from the static pressure groove 22 to the outer peripheral side increases. By the amount of the increase, the amount of flow to the low-pressure fluid side of the sealing gas flowing to the inner peripheral side is reduced, leakage of the sealed fluid can be reduced, and sealing performance can be improved. Sealing performance is higher than in the first embodiment since the land portion R is present circumferentially continuously on the inner diameter side of the sliding faces sliding relatively.

(2) Since dynamic pressure (positive pressure) is generated at the Rayleigh steps of the downstream ends 54b of the spiral grooves 54, the gap between the sliding face S2 of the stationary-side seal ring 2 and the sliding face S3 of the rotating-side seal ring 3 is widened. Thus, even when the amount of supply of the sealing gas is reduced, a non-contact hydrostatic sealing function can be maintained.

Fifth Embodiment

Figure 6A:
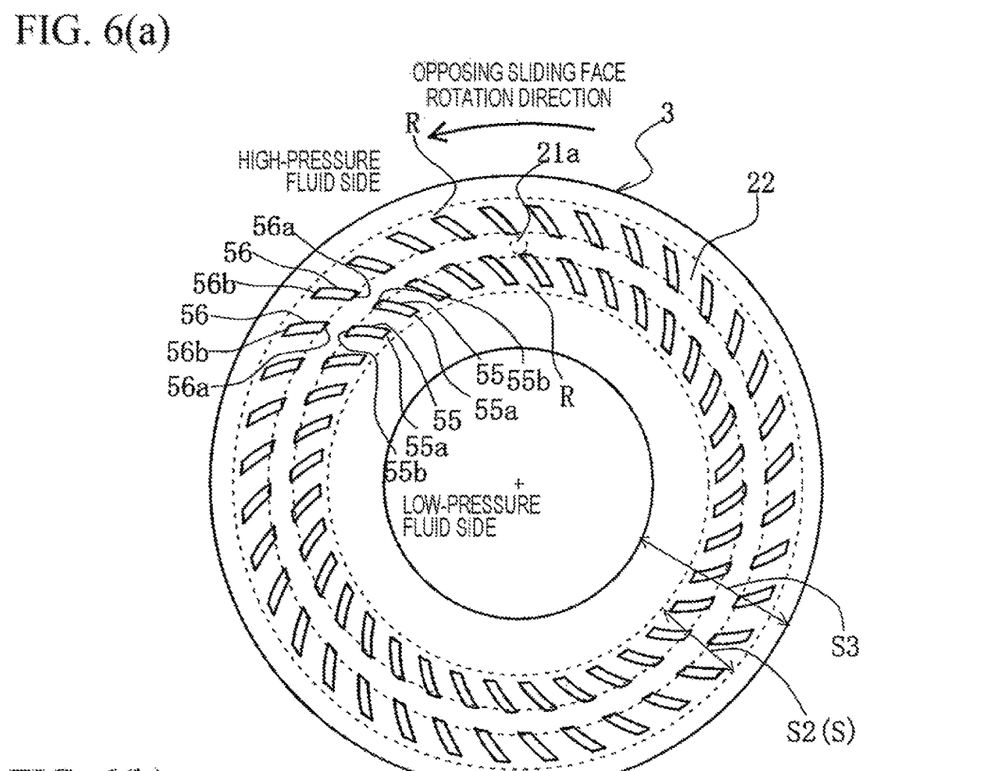
Figure 6B:
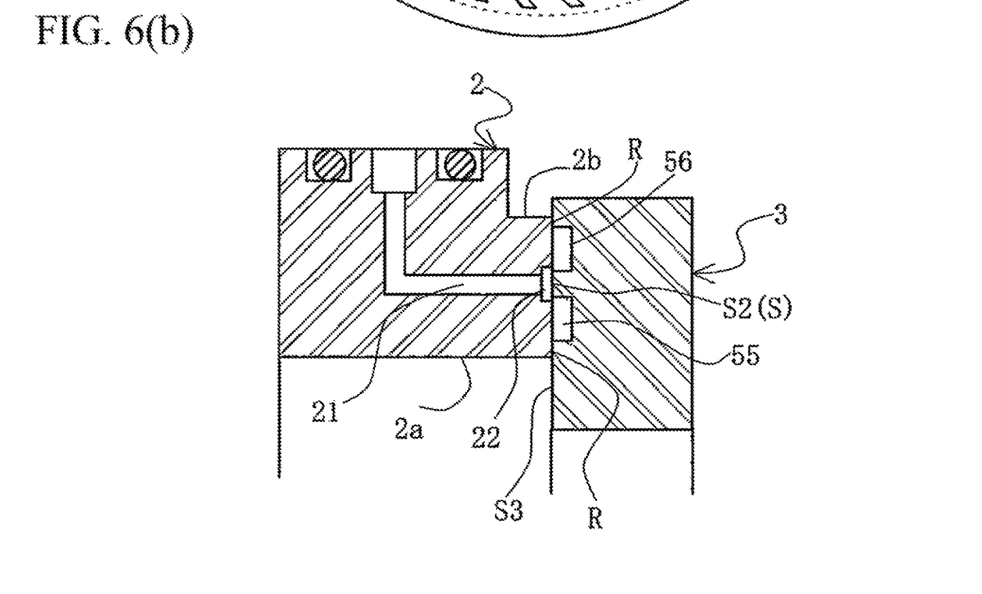

With reference to FIG. 6, a sealing device according to a fifth embodiment of the present invention will be described.

The sealing device according to the fifth embodiment is different from the sealing device in the first embodiment in that pumping grooves 5 are formed by low-pressure fluid-side pumping grooves and high-pressure fluid-side pumping grooves. Other basic configuration is identical to that in the first embodiment, and the same members are given the same reference numerals and letters to omit redundant descriptions.

In FIG. 6, the pumping grooves 5 are formed by low-pressure fluid-side pumping grooves 5A located on the low-pressure fluid side of a static pressure groove 22 and high-pressure fluid-side pumping grooves 5B located on the high-pressure fluid side of the static pressure groove 22. Thirty-six spiral grooves 55 constituting the low-pressure fluid-side pumping grooves 5A are disposed such that upstream ends 55a are isolated from the low-pressure fluid side by a land portion R and downstream ends 55b communicate with the static pressure groove 22. Thirty-six spiral grooves 56 constituting the high-pressure fluid-side pumping grooves 5B are disposed such that upstream ends 56a communicate with the static pressure groove 22 and downstream ends 56b are isolated from the high-pressure fluid side by a land portion R.

In FIG. 6, the spiral grooves 55 and 56 constituting the low-pressure fluid-side pumping grooves 5A and the high-pressure fluid-side pumping grooves 5B, respectively, are spaced circumferentially evenly, but are not limited to this. It is essential only that one or more spiral grooves 55 and one or more spiral grooves 56 be provided.

The width, depth, spiral angle, and length of the spiral grooves 55 and 56 are determined in terms of design, with the diameter, width, and relative sliding speed of a sliding face, and the properties of sealing gas taken into consideration.

Now, when sealing gas is supplied from the static pressure groove 22, and a rotating shaft 50 is driven to be rotated, a rotating-side seal ring 3 rotates, and a sliding face S2 of a stationary-side seal ring 2 and a sliding face S3 of the rotating-side seal ring 3 slide relatively. This relative sliding causes the spiral grooves 55 constituting the low-pressure fluid-side pumping grooves 5A to act to convey fluid flowing into the spiral grooves 55 to the high-pressure fluid side, thus forcing the sealing gas supplied from the static pressure groove 22 and flowing toward the low-pressure fluid side to leak, back to the high-pressure fluid side. Consequently, the amount of flow of the sealing gas flowing to the low-pressure fluid side is reduced, leakage of sealed fluid can be reduced, and sealing performance can be improved.

At the same time, the spiral grooves 56 constituting the high-pressure fluid-side pumping grooves 5B act to convey fluid flowing into the spiral grooves 56 to the high-pressure fluid side, so that pressure on the outer peripheral side of the sliding faces S2 and S3 provided with the spiral grooves 56 decreases. Consequently, the pressure flow of the sealing gas flowing out from the static pressure groove 22 to the outer peripheral side increases. By the amount of the increase, the amount of flow to the low-pressure fluid side of the sealing gas flowing to the inner peripheral side is reduced, leakage of the sealed fluid can be reduced, and sealing performance can be improved.

At that time, dynamic pressure (positive pressure) is generated at Rayleigh steps of the downstream ends 56b of the spiral grooves 56, so that a gap between the sliding face S2 of the stationary-side seal ring 2 and the sliding face S3 of the rotating-side seal ring 3 is widened. Thus, even when the amount of supply of the sealing gas is reduced, a non-contact hydrostatic sealing function can be maintained.

When the sealing device is at rest, the sealed fluid does not leak because continuous land portions R are formed in the vicinity of the inner diameter and in the vicinity of the outer diameter of the sliding faces S.

The configuration in the fifth embodiment described above achieves the following effects.

(1) The pumping grooves 5 are formed by the low-pressure fluid-side pumping grooves 5A located on the low-pressure fluid side of the static pressure groove 22 and the high-pressure fluid-side pumping grooves 5B located on the high-pressure fluid side of the static pressure groove 22. The low-pressure fluid-side pumping grooves 5A are the spiral grooves 55 disposed such that the upstream ends 55a are isolated from the low-pressure fluid side by the land portion R and the downstream ends 55b communicate with the static pressure groove 22. The high-pressure fluid-side pumping grooves 5B are the spiral grooves 56 disposed such that the upstream ends 56a communicate with the static pressure groove 22 and the downstream ends 56b are isolated from the high-pressure fluid side by the land portion R. Thus, the spiral grooves 55 force sealing gas supplied from the static pressure groove 22 and flowing toward the low-pressure fluid side to leak, back to the high-pressure fluid side, and the spiral grooves 56 reduce pressure on the outer peripheral side of the sliding faces S, increasing the pressure flow of the sealing gas flowing out from the static pressure groove 22 to the outer peripheral side. By the amount of the increase, the amount of flow to the low-pressure fluid side of the sealing gas flowing to the inner peripheral side is reduced, so that leakage of sealed fluid can be further reduced, and sealing performance can be further improved.

(2) Since dynamic pressure (positive pressure) is generated at the Rayleigh steps of the downstream ends 56b of the spiral grooves 56, the gap between the sliding face S2 of the stationary-side seal ring 2 and the sliding face S3 of the rotating-side seal ring 3 is widened. Thus, even when the amount of supply of the sealing gas is reduced, a non-contact hydrostatic sealing function can be maintained.

Although the embodiments of the present invention have been described above with reference to the drawings, specific configurations are not limited to these embodiments. Any changes and additions made without departing from the scope of the present invention are included in the present invention.

For example, the above embodiments have been described as an inside type in which the outer peripheral side of sliding components is the sealed fluid side (high-pressure fluid side), and the inner peripheral side is the low-pressure fluid side (e.g. atmosphere side). The present invention is not limited to this, and is also applicable to an outside type in which the outer peripheral side is the low-pressure fluid side (e.g. atmosphere side) and the inner peripheral side is the sealed fluid side (high-pressure fluid side).

For example, the above embodiments have been described on the case where the static pressure groove 22 is formed in the stationary-side seal ring 2 and the pumping grooves 5 are formed in the rotating-side seal ring 3, but this is not limiting. The pumping grooves 5 may be formed in the stationary-side seal ring 2 and the static pressure groove may be formed in the rotating-side seal ring 3. Alternatively, the static pressure groove 22 and the pumping grooves 5 may be formed in one of the seal rings.

For example, the above embodiments have been described on the case where the position in which the static pressure groove 22 is formed is substantially the radial center of the sliding face S, but this is not limiting. The static pressure groove 22 may be disposed in a radial position offset toward either the low-pressure fluid side or the high-pressure fluid side.

REFERENCE SIGN LIST 1 sealing device
2 stationary-side seal ring
2a inner diameter
2b outer diameter
3 rotating-side seal ring
5 pumping groove
51, 52, 53, 54, 55, 56 spiral groove
51a, 52a, 53a, 54a, 55a, 56a upstream end of spiral groove
51b 52b, 53b, 54b, 55b, 56b downstream end of spiral groove
21 sealing gas supply passage
21a opening
22 static pressure groove
31, 32, 33 O-ring
40 holder
41 hole
42 spring
43, 61 communicating path
45 snap ring
46 sleeve
47 first retainer
48 second retainer
50 rotating shaft
60 housing
62 O-ring
S2 sliding face of stationary-side seal ring
S3 sliding face of rotating-side seal ring
S relative sliding face
R land portion (smooth portion)

The invention claimed is:

1. A sealing device comprising a pair of sliding components that slide relative to each other, one of the sliding components being a stationary-side seal ring, the other of the sliding components being a rotating-side seal ring, the seal rings each having a sliding face extending radially for sealing sealed fluid against leakage,
   among the sliding faces of the seal rings, only the sliding face of the stationary-side seal ring being provided with a static pressure groove which communicates with a sealing gas supply passage and is circumferentially continuously formed on the sliding face of the stationary-side seal ring, and
   only the sliding face of the rotating-side seal ring being provided with pumping grooves capable of controlling a radial flow of sealing gas to a flow from a low-pressure fluid side to a high-pressure fluid side by relative sliding of the sliding faces,
   wherein the pumping grooves are located on an inner diameter side of the static pressure groove, and are spiral grooves disposed in a manner that upstream ends of the spiral grooves are open to and communicate with an inner diameter side of the seal rings, and downstream ends of the spiral grooves are isolated from the static pressure groove by land portions formed on the sliding faces of the seal rings, respectively.

2. A sealing device comprising a pair of sliding components that slide relative to each other, one of the sliding components being a stationary-side seal ring, the other of the sliding components being a rotating-side seal ring, the seal rings each having a sliding face extending radially for sealing sealed fluid against leakage,
   among the sliding faces of the seal rings, only the sliding face of the stationary-side seal ring being provided with a static pressure groove which communicates with a sealing gas supply passage and is circumferentially continuously formed on the sliding face of the stationary-side seal ring, and
   only the sliding face of the rotating-side seal ring being provided with pumping grooves capable of controlling a radial flow of sealing gas to a flow from a low-pressure fluid side to a high-pressure fluid side by relative sliding of the sliding faces,
   wherein the pumping grooves are located on an inner diameter side of the static pressure groove, and are spiral grooves disposed in a manner that upstream ends of the spiral groves are isolated from an inner diameter side of the seal rings by land portions formed on the sliding faces of the seal rings, respectively, and downstream ends of the spiral grooves are open to and communicate with the static pressure groove.

* * * * *